United States Patent
Moreillon

(10) Patent No.: US 7,725,720 B2
(45) Date of Patent: May 25, 2010

(54) METHOD FOR GENERATING AND MANAGING A LOCAL AREA NETWORK

(75) Inventor: Guy Moreillon, Echallens (CH)

(73) Assignee: Nagravision S.A., Cheseaux-sur Lausanne (CH)

( * ) Notice: Subject to any disclaimer, the term of this patent is extended or adjusted under 35 U.S.C. 154(b) by 775 days.

(21) Appl. No.: 10/564,544

(22) PCT Filed: Jul. 6, 2004

(86) PCT No.: PCT/IB2004/051130

§ 371 (c)(1),
(2), (4) Date: Jan. 13, 2006

(87) PCT Pub. No.: WO2005/006706

PCT Pub. Date: Jan. 20, 2005

(65) Prior Publication Data

US 2006/0161969 A1 Jul. 20, 2006

(30) Foreign Application Priority Data

Jul. 14, 2003 (CH) .................................. 1233/03

(51) Int. Cl.
*H04L 9/32* (2006.01)
(52) U.S. Cl. ..................................... 713/171; 380/228
(58) Field of Classification Search ................ 173/171, 173/170, 168, 150, 155, 156–159, 163, 172, 173/173; 380/47–227, 229, 241, 232, 45, 380/228, 277; 726/2, 5, 9, 27, 32, 35; 725/31; 713/171, 170, 168, 150, 155, 156–159, 163, 713/172, 173
See application file for complete search history.

(56) References Cited

U.S. PATENT DOCUMENTS 4,227,253 A * 10/1980 Ehrsam et al. ................ 380/45

(Continued)

FOREIGN PATENT DOCUMENTS

WO     WO 00/57636     *  9/2000

(Continued)

OTHER PUBLICATIONS

Stefano Zanero ,Smart card content security , 1997 , Plitecnico di Milano, version 1.0.*

(Continued)

*Primary Examiner*—Emmanuel L Moise
*Assistant Examiner*—Abu Sholeman
(74) *Attorney, Agent, or Firm*—Harness, Dickey & Pierce, P.L.C.

(57) ABSTRACT

The present invention relates to a method for creating and managing a local area network including at least one device for reproducing an encrypted data flow and a device for transmitting and re-encrypting all or part of said encrypted data, which devices include security modules. The method includes the steps of connecting a so-called master security module in one of the devices connected to the local area network, causing the master security module to generate a network key, securely transmitting the network key to one or more so-called user security modules, decrypting the data encrypted by the transmission and re-encryption device, re-encrypting the data with said device by means of a local key, transmitting the re-encrypted data to the reproduction device, and holding the reproduction device to perform decryption using the user security module associated therewith and provided with means for locating the local key.

11 Claims, 1 Drawing Sheet

U.S. PATENT DOCUMENTS

| | | | | |
|---|---|---|---|---|
| 4,649,233 | A | * | 3/1987 | Bass et al. .................. 713/171 |
| 6,055,314 | A | * | 4/2000 | Spies et al. ................. 380/228 |
| 6,246,767 | B1 | * | 6/2001 | Akins et al. ................. 380/210 |
| 6,466,671 | B1 | * | 10/2002 | Maillard et al. ............. 380/227 |
| 6,560,340 | B1 | * | 5/2003 | Akins et al. ................. 380/210 |
| 6,834,110 | B1 | * | 12/2004 | Marconcini et al. ......... 380/239 |
| 6,987,854 | B2 | * | 1/2006 | Maillard ..................... 380/210 |
| 6,993,137 | B2 | * | 1/2006 | Fransdonk .................. 380/279 |
| 7,062,658 | B1 | * | 6/2006 | Cheriton et al. ............. 713/189 |
| 7,191,335 | B1 | * | 3/2007 | Maillard ..................... 713/176 |
| 2001/0017920 | A1 | * | 8/2001 | Son et al. .................... 380/212 |
| 2002/0191548 | A1 | * | 12/2002 | Ylonen et al. ............... 370/254 |
| 2003/0110382 | A1 | * | 6/2003 | Leporini et al. ............. 713/172 |
| 2003/0135730 | A1 | * | 7/2003 | Szucs et al. ................. 713/153 |
| 2003/0174844 | A1 | * | 9/2003 | Candelore ................... 380/277 |
| 2003/0198351 | A1 | * | 10/2003 | Foster et al. ................. 380/281 |
| 2007/0088960 | A1 | * | 4/2007 | Saito .......................... 713/193 |

FOREIGN PATENT DOCUMENTS

| | | | |
|---|---|---|---|
| WO | WO 01/52473 A | | 7/2001 |
| WO | WO 01/67705 | * | 9/2001 |
| WO | WO 01/67705 A | | 9/2001 |
| WO | WO 03/001807 | * | 1/2003 |
| WO | WO 03001807 | | 1/2003 |

OTHER PUBLICATIONS

Bart J. van Rijsoever et al, Interoperable protection for digital multimedia content, 2003, Kluwer Academic Publisers, pp. 167-179.*

Office Action for corresponding Chinese Application No. 2004/80019780.9 dated Nov. 7, 2008.

* cited by examiner

METHOD FOR GENERATING AND MANAGING A LOCAL AREA NETWORK

INTRODUCTION

This invention concerns the domain of a local area network creation and administration, in particular a local area network connected to an access point to a conditional access data stream.

BACKGROUND ART

The management of the access to conditional data is well known and has been practiced since a long time particularly in the Pay-TV field.

The user has a decoder for decrypting the encrypted stream by means of keys that are associated to subscription or rights. These keys are generally preferably stored in a removable security module in order to allow the evolution of the functions offered as well as the security.

Most decoders, once the data stream has been decrypted, convert this data into an analogue form to be processed by a visualization device, such as a television screen.

The advent of digital screens has somehow disrupted this scheme. In fact, since the decoder output towards the display is digital, this output can be used in a fraudulent way to produce illegal copies.

For this reason, before digital displays and more generally any apparatus processing this type of data in digital form, such as digital recorders, become widely used, solutions have been proposed with the aim of preventing the dissemination of conditional access data.

Thus, an end-to-end protection of the content has been proposed in order to maintain the content in an encrypted form until it reaches the restitution device (a television set for example).

A source such as a decoder or a DVD reader processes the encrypted content and authorizes access as long as the conditions are fulfilled (according to the user's subscription, for example). The content, before being sent to the user's local network, is encrypted again according to a key associated to this network, so that it can only be accessible in this network. Any use outside this network is impossible given that the key is unique for each domestic network.

The concept of domestic network, although defined in relation to a user, can be vague since a neighbor can easily connect to the same network and thus dispose of the same network key. For this reason the simplest solution is to limit the number of people forming a local network.

To use this type of secure local network, each device must have a security module containing the secret pertaining to this network. These modules are in general either in the form of a removable smart card or a security module directly mounted in the apparatus.

According to a first known solution, this limitation concept has been implemented by the transmission of a parent capacity belonging to the network. For the installation of a local network, a first module contains or is capable of generating the key that serves as a common point in this network. Once this first module has generated a first key, it becomes a parent module and can function on its own. If another module appears in the same network, this parent capacity is transmitted to this second module, allowing the latter to be a part of the same network. The first module loses its parent capacity and this ability is transferred to the second module. Of course, other parameters, such as the number of future modules participating in this network, are also decremented and stored in the new generator module.

The move of the parent capacity meets security criteria because one module can only introduce one other module into the same network. Nevertheless this solution presents certain problems, since the chain can be interrupted through ignorance of the principle, in the case that a user separates one of the elements that precisely had become the parent module. Furthermore, if the apparatus in which this module is present were damaged, the user would take it to a point of sale and exchange it for another apparatus, which results in the interruption of the possibility of extending this network.

The document WO01/67705 describes a system for a secure transfer of data and data management on the Internet network comprising a data transfer and encryption module in a user unit, and a data management module in a server unit. The data transfer is carried out through the moving of the data from a window displayed on a screen associated to the user unit from or to a window associated to the server unit. Each window is associated with a password in such a way that the moving of the data from a window to the other causes the encryption or the re-encryption from one associated password to the other. The system uses symmetric key encryption coupled with the file transfer protocol and allows a secure transfer of large data files which size is 100 Megabytes or more. This data transfer from the server unit to the user unit or vice versa can be carried out an unlimited number of times independently of the network and of the units' locations on the network.

BRIEF DESCRIPTION OF THE INVENTION

The aim of this invention is to propose a method for creating and managing a local network which overcomes the drawbacks described above.

This aim is achieved by a method for creating and managing a local area network, this network comprising at least one restitution device for an encrypted data stream and a diffusion and re-encrypting device for all or part of said encrypted data, said devices comprising security modules, this method comprising the following steps:
 connection of a security module called "master" in one of the devices connected to the local network,
 establishment of a local network key by the master security module,
 secure transmission of this network key to one or more security modules called "user",
 decrypting of encrypted data by the diffusion and re-encrypting device,
 re-encrypting of the data by said device using a local key,
 transmission of the re-encrypted data to the restitution device,
 decrypting by said restitution device thanks to the associated user security module, which comprising means to locate the local key.

A restitution device is a device in which it is imperative that data is decrypted for its use, in audio, video or other forms, such as stock-exchange data or games. The most characteristic example is a television set.

All the remaining steps on the data are carried out on encrypted data.

A session key is a randomly generated key, which is then encrypted with the network key. Encrypted data is accompanied by this session key that is encrypted by the network key. Thus, the knowledge of the network key allows the session key to be obtained and the data to be accessed.

Of course, it is possible to envisage the direct use of the network key and only the transmission of re-encrypted data. In the following description, the local key includes both concepts i.e. session key or network key.

For the encryption of data there are two principles. The first refers to the encryption of the set of data by the local key. The security module known as the "converter module" comprises means to decrypt the data and re-encrypt said data by the local key, only if the rights exist. According to the flow rate and the data size, the capacity required for this operation may be very important.

A second principle is based on a key file, known as "Control Words". Data is not modified and remains encrypted by the set of keys; only the key file is decrypted by the converter module and re-encrypted by the local key.

It should be noted that the set of keys can be reduced to just one key per event and can be processed as previously described i.e. the message comprising this key is decrypted by the converter module and re-encrypted by the local key.

A diffusion and re-encrypting device, for example, is a decoder connected to a network providing conditional access data or an encrypted data reader, such as a DVD reader.

This device verifies whether the right to decrypt the data exists before diffusing said data on the local network. If the right exists, said data is re-encrypted after the decrypting stage thanks to the local key.

Consequently this data can only be processed on this network.

The data re-encrypted in this way can be stored on a hard disk or engraved on a DVD. The interest of the local network lies in the fact that this data cannot be processed outside this local network. During the processing of this data, the storage device diffuses the data in the network, this data comprising an encrypted useful part (audio and video, for example) and a management part that includes the session key encrypted by the network key.

The master security module will be responsible for initializing each user security module wishing to take part to this network. Therefore, it should be evident to the user that this first module has a particular function and that it is important not to lose it.

Such master module also includes a counter for defining the maximum number of modules that can be initialized, and a certificate showing the membership of this module to the local networks system.

The problem of separating the apparatus, in which the master module is found, is thus solved. For practical reasons, the master module will have a visual mark with respect to the other modules.

The establishment of a network key can be carried out in two ways. The first consists in randomly generating this key during a first initialization of the local network.

The second consists in using a key loaded during a personalization procedure of the master module. The keys are thus known in advance by the issuing authority.

The master module, as a first task, must initialize a network. The user module is a passive part of this network and receives the network key established by the master module. In practice, it is possible to integrate a user module in the physical module containing the master module. This allows operation in a network with only one module, the initialization consisting in transferring the network key of the master part to the user part of the same physical module.

BRIEF DESCRIPTION OF THE FIGURES

The invention will be better understood thanks to the detailed following description, which refers to the annexed drawing which is given as a non-limitative example, and which describes the configuration of a local network.

DETAILED DESCRIPTION

Figure 1:
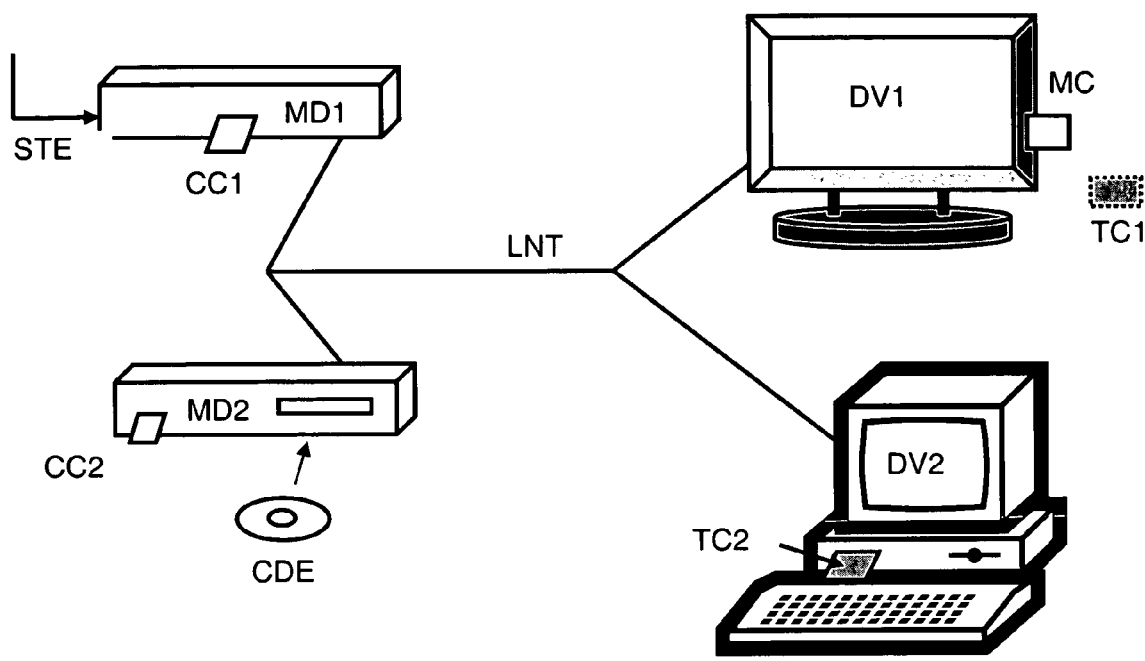

In FIG. 1, the local network is identified as LNT. It links the different elements connected in a house for example.

There are two types of devices, namely restitution devices such as a television set DV1, and a computer DV2. The other devices are the diffusion and decryption devices, such as a decoder MD1 or a disk reader MD2.

The encrypted data stream STE enters into the decoder MD1 to be processed. This decoder has a security module CC1 including the rights associated to the encrypted data content. The module CC1 verifies the rights that allow access to this encrypted data and, in the case of the transmission of data encrypted by control-words CW, it decrypts these control-words and re-encrypts the latter using the local key.

According to the operating mode, the local key is a session key generated by the converter module MD1 and encrypted by the network key. This encrypting step of the local key is not carried out in the converter module MD1, but rather in a user module TC that only disposes of the network key.

During an initialization step, the converter module generates a random session key. In collaboration with the decoder, said module transmits a request in order to determine the presence of a local network. A restitution device, for example the television set DV1, reacts and transmits the public key of its user module TC1.

This key will be used by the converter module for encrypting the session key MD1 and transmitting this encrypted set to the user module of the television set.

The user module TC1, thanks to its private key, decrypts this message and extracts the session key. Then it encrypts this session key by means of the network key and transmits this new message to the converter module.

When the converter module receives a message including a control word originating from the conditional access data stream STE, it verifies the rights contained in this message and, if the rights are present, decrypts the control word and re-encrypts the latter by means of the session key. The new message contains the control word re-encrypted by the session key and the session key encrypted by the network key.

The functioning of a device such as a DVD reader is noticeably similar. This device also includes a converter module CC2 that comprises means for accessing encrypted data contained on the disk.

In our example, it will be assumed that data is encrypted by a key pertaining to the content according to an algorithm, and/or a content key in the converter module.

This converter module CC2 verifies if the owner of the module has the right to decrypt and broadcast the disk CDE on a local network. If the right exists, there may be two possibilities:

the converter module CC2 decrypts the content on the disk and re-encrypts this content by means of the network key, the re-encrypted data and the network key being transmitted to the restitution device, the converter module only encrypts the key of the disk by means of the network key and transmits the initial data and the disk key encrypted by the network key. This method assumes that each content has a corresponding disk key; on the contrary, the access to a content opens the possibility of accessing all contents.

According to one of the aspects of the invention, the master module MC is located in a television set DV1. This master module allows the generation of the local network and disposes of the network key NK. In one embodiment, this module also comprises the functionality of a user module and can thus decrypt encrypted data transmitted by a device such as a decoder MD1.

When a second blank user module TC2 is connected, in this case to a computer DV2, a communication is established between the master module MC and this blank module. After reciprocal authentication, the master module transmits the network key NK to the user module TC2, which from now on has the possibility of receiving and decrypting data of this local network. Thereafter, the presence of the master key MC is no longer necessary for accessing data encrypted by the local key, since it has the network key NK.

The basic principle for qualifying a local network is the number of possible user modules. This function is intended for the master module, which reduces the counter each time a user module receives the network key.

If it is desired to clearly differentiate the network creating function and the function for accessing encrypted data, it is possible to only include the network managing function in the master module MC. Once initialized the user module TC2, the master module MC is removed and a previously configured user module TC1 is introduced.

The invention also applies to a verification method for the conformity of a local network. During the negotiation between a terminal module TC and a converter module CC, the terminal module transmits data pertaining to the master module MC on the basis of the formation of this network. It can be an identifier, a signature or a certificate (X509 for example).

Due to the fact that only the master modules MC can generate a local network, only this kind of module, whose number is much lower than the number of user modules in operation, will be taken into account.

The converter module CC stores this piece of information, known as local network identifier.

In the case of a Pay-TV decoder, the latter should be connected to a management center for updating, for statistical reasons or for invoicing local consumption.

At this point the converter module CC transmits, together with the usual data, the local network identifier associated to this decoder.

The management center has a list of local network identifiers not authorized to receive decrypted data from a converter module and communicates this information to said module.

The converter module can therefore accept or deny to operate with a such network.

It should be noted that a converter module can interact with several locals networks, for example, if a third party wanted to connect its terminal module in the television set DV1. In this configuration, the converter module can keep several network identifiers in its memory.

In one embodiment, encrypted data, in particular messages containing decryption key or keys, can contain conditions making this type of verification mandatory and prior to any re-encrypting for a given local network.

The decoder then executes a verification operation in order to validate the identifier of the local network to which it is connected. If during the negotiation of the local key, another network identifier appears, it will not allow the decrypting of the control word for the local network.

Therefore, it is possible to introduce conditions into the encrypted data or into the keys accompanying said data in order to define a security level.

It should be noted that the embodiment is particularly appropriate for restitution devices having the security module directly mounted on the print. This module, in the form of an electronic circuit (eventually welded), comprises all the functions of a user security module. Only the master module will be removable and will be connected only in order to initialize the network and load the network key into this electronic circuit. If this device moves to another network, only an authorization for eliminating the membership to the previous network and an authorization for entering the new network are required.

To reuse the data already stored and encrypted by the network key, the master module again plays the role of the user module with its own network key.

The invention claimed is:

1. A method for creating and managing a local network, the local network including at least one restitution device for receiving an encrypted data stream and at least one diffusion and re-encrypting device for transmitting all or part of the encrypted data stream to the restitution device, the at least one restitution device and the at least one diffusion and re-encrypting device including at least one security module, the method comprising
during an initialization stage:
connecting a master security module to one of the at least one restitution device and the at least one diffusion and re-encrypting device connected to the local network,
establishing a network key by the master security module, and
securely transmitting the network key over the local network to the at least one security module included in the at least one restitution device and the at least one diffusion and re-encrypting device, wherein
when the master security module is connected to the at least one restitution device, the network key is securely transmitted to the at least one diffusion and re-encrypting device, and
when the master security module is connected to the at least one diffusion and re-encrypting device, the network key is securely transmitted to the at least one restitution device,
and while receiving the encrypted data stream:
decrypting the encrypted data stream by the at least one diffusion and re-encrypting device,
re-encrypting the decrypted data stream by the at least one diffusion and re-encrypting device using a local key, the local key being a session key that is generated by the at least one diffusion and re-encrypting device and that is encrypted by the network key,
transmitting the re-encrypted data stream to the at least one restitution device, and
decrypting the received encrypted data stream by the at least one restitution device using the associated security module, the associated security module including means to decrypt the local key using the network key.

2. The method for creating and managing a local network according to claim 1, wherein the local key is a randomly generated session key encrypted by the network key.

3. The method for creating and managing a local network according to claim 1, wherein the local key is the network key.

4. The method for creating and managing a local network according to claim 1, wherein the network key is established by a pseudo-random generation of the network key during the initialization of the local network.

5. The method for creating and managing a local network according to claim 1, wherein the network key is established during an initialization step of the master security module.

6. The method for creating and managing a local network according to claim 1, wherein the master security module is placed in a removable security module.

7. The method for creating and managing a local network according to claim 6, wherein the removable security module includes a user module forming part of the network administrated by the master security module.

8. The method for creating and managing a local network according to claim 1, wherein the associated security module is in the form of an electronic circuit mounted during the manufacture of the restitution device.

9. The method for creating and managing a local network according to claim 1, wherein the associated security module is in the form of a removable security module.

10. The method for creating and managing a local network according to claim 1, wherein the at least one diffusion and re-encrypting device includes a converter module, and
    wherein the converter module receives and stores an identifier of the master security module that created the local network, and the converter module re-encrypting data pertaining to the local network.

11. The method for creating and managing a local network according to claim 10, wherein the identifier of the master security module is transmitted to a management center during a connection step to the management center.

* * * * *